United States Patent
Hinson

(10) Patent No.: US 6,478,311 B1
(45) Date of Patent: Nov. 12, 2002

(54) EXPENDABLE JAW SYSTEM

(76) Inventor: Ronald L. Hinson, P.O. Box 486, Piedmont, SC (US) 29673

( * ) Notice: Subject to any disclaimer, the term of this patent is extended or adjusted under 35 U.S.C. 154(b) by 0 days.

(21) Appl. No.: 09/575,603

(22) Filed: May 22, 2000

(51) Int. Cl.[7] .............................................. B23B 31/16
(52) U.S. Cl. ........................ 279/123; 279/153; 279/154
(58) Field of Search ................................ 279/123, 124, 279/152–154

(56) References Cited

U.S. PATENT DOCUMENTS

| | | | |
|---|---|---|---|
| 2,687,308 A | * 8/1954 | Highberg et al. | 279/123 |
| 2,815,959 A | * 12/1957 | Vandenberg | 279/123 |
| 2,950,117 A | * 8/1960 | Walmsley | 279/123 |
| 3,190,666 A | * 6/1965 | Testa | 279/123 |
| 4,706,973 A | 11/1987 | Covarrubias et al. | 279/1 SJ |
| 4,772,034 A | 9/1988 | Brown | 279/1 SJ |
| 4,960,285 A | * 10/1990 | Doi | 279/123 |
| 5,040,806 A | * 8/1991 | Hiestand | 279/123 |
| 5,112,067 A | * 5/1992 | Rinchak | 279/151 |
| 5,236,207 A | 8/1993 | Ramunas et al. | 279/123 |
| 5,542,686 A | 8/1996 | Revuelta | 279/153 |
| 5,735,534 A | 4/1998 | Edwards | 279/124 |
| 5,791,661 A | 8/1998 | Reyes | 279/123 |
| 5,842,704 A | 12/1998 | Gilliam | 279/124 |
| 5,845,912 A | 12/1998 | Grupa | 279/124 |

FOREIGN PATENT DOCUMENTS

JP 40424008 * 8/1992 ................. 279/123

OTHER PUBLICATIONS

Web Page for "Jiffy Jaws" by H & S Machine Works, Inc., downloaded May 11, 2000.

* cited by examiner

*Primary Examiner*—Steven C. Bishop
(74) *Attorney, Agent, or Firm*—Leatherwood Walker Todd & Mann, P.C.

(57) ABSTRACT

An expendable jaw combination for use in connection with a chuck for a lathe, milling machine, or the like to hold work stock. A receiver member is attached to the chuck, and an engagement member is provided in an elongated recess in the receiver member for engaging the stock. The receiver member is preferably constructed of tool material, such as tool steel, while the engagement member may be made of a lower cost material which is easier to work, such as mild steel. After the engagement member is used one or more times, it may be reworked or expended. Locking means are provided for securing the engagement member to the receiver member during use.

27 Claims, 6 Drawing Sheets

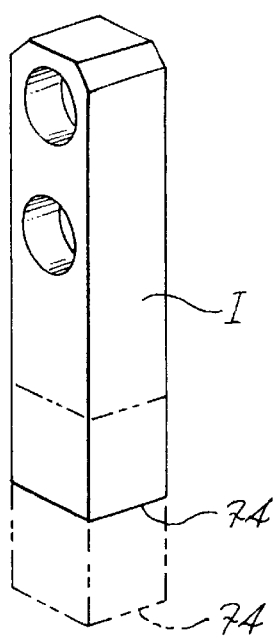 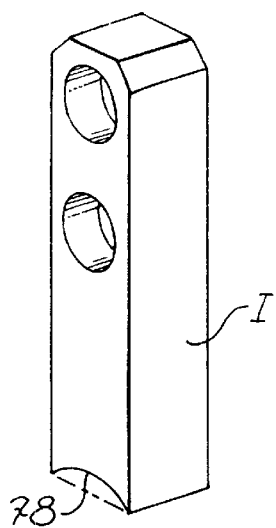 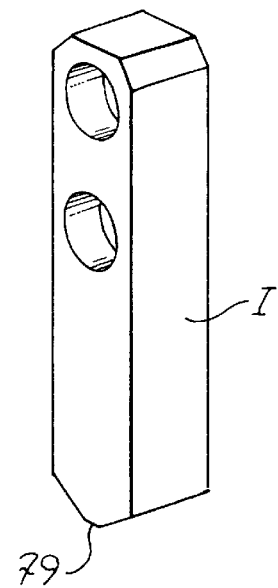
Fig. 3A          Fig. 3B          Fig. 3C
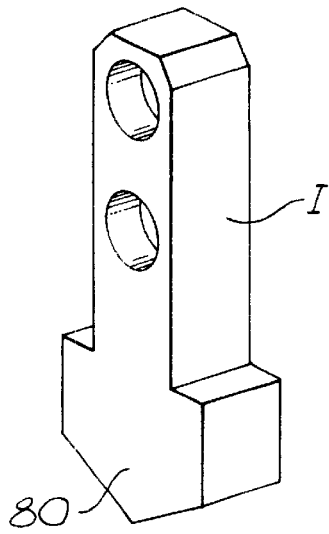 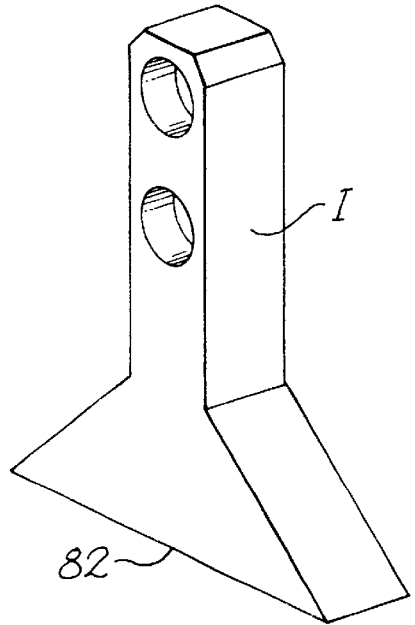
Fig. 3D          Fig. 3E

EXPENDABLE JAW SYSTEM

BACKGROUND OF THE INVENTION

This invention relates generally to an expendable jaw system for use in connection with lathes, milling machines and other machines which rotatably work stock or work pieces through cutting or other machining operations.

In machining operations, lathes, milling machines, or the like are used to cut, grind, or otherwise shape stock or work pieces. These machines generally use a chuck in order to hold the work piece during the machining operations.

Chucks typically include three or four jaws which move radially inwardly and outwardly with respect to a central, axial passage provided in the chuck for receiving the raw stock or work piece. Movement of the jaws, sometimes referred to as "master jaws," may be performed dependently or independently with respect to one another, and the jaws are ordinarily attached to mechanical or hydraulic means and move within channels provided in the chuck. In many instances, these channels have an inverted T-shape for receiving and securing jaw nuts to which top jaws, also referred to as "soft jaws," are attached.

The top jaws may be attached to the master jaws in a variety of ways, but perhaps the most common means is through use of serrated rails or tracks, which are provided on the master jaws and which mate with corresponding serrations on the bottom of the top jaws. The top jaws are positioned radially inwardly or outwardly at the desired location on the master jaw, and are then bolted into place using bolts which engage the jaw nuts to securely hold the top jaw in place.

The top, or soft, jaws are positioned on the master jaw such that as the master jaws move inwardly, the extreme ends of the top jaws on the chuck approach one another and are configured to grip the work piece therebetween. Because the ends of the top jaws may themselves require boring or other machining to accommodate and hold the work piece, the top jaws may find limited, or even one-time use for clamping a particular work piece for a production run of such work pieces. Thereafter, the top jaws may no longer be practical for use and are thus subsequently discarded.

Because of the provision of serrations on the bottom of such top jaws, their cost of manufacture is significant, and it would be desirable to have top jaws which could be re-used more frequently and/or which are less costly to manufacture. Moreover, it would be desirable to provide a top jaw design which could be readily made from conventional bar stock or other material generally found on-hand in machine shops.

Numerous jaw configurations have been patented. For example, U.S. Pat. No. 4,772,034, issued to Brown, discloses a soft jaw system having a lock ring with studs and nuts for adjusting the soft jaws. U.S. Pat. No. 5,236,207, issued to Ramunas, et al, discloses a segmented adjustable top jaw having a slot for allowing variable gripping forces.

U.S. Pat. No. 5,735,534, issued to Edwards, discloses a top jaw having a recessed slot for receiving a locking ridge of a mounting base, the mounting base including tracks received by rails of the top jaw.

U.S. Pat. No. 4,706,973, issued to Covarrubias, et al, and U.S. Pat. No. 5,542,686, issued to Revuelta, also disclose other chuck-gripping arrangements. Further, U.S. Pat. No. 5,842,704, issued to Gilliam, discloses quick-change jaw inserts for use in connection with a chuck.

Apparently, some form of reusable top jaws with expendable soft jaw inserts are offered for sale by H&S Machine Works of Kent, Wash.

While the foregoing designs are known, there still exists a need for an expendable jaw system which is versatile in its application and allows for use of readily available, standard materials for manufacture of expendable components.

SUMMARY OF THE INVENTION

It is, therefore, the principal object of this invention to provide a jaw system having expendable jaw members.

It is another object of the present invention to provide a jaw system having a receiver, or pocket, member for attachment to a jaw of a chuck and a jaw insert for receipt in the pocket member.

A further object of the present invention is to provide an expendable jaw member which is relatively simple to manufacture from readily available stock materials.

Another object of the present invention is to provide jaw members of a variety of configurations for use in gripping work pieces of various shapes.

Yet another object of the present invention is to provide a pocket member and jaw insert member, wherein the pocket member can be configured for use on a variety of different chuck configurations.

A still further object of the present invention is to provide multiple jaw insert members for use in connection with the pocket member in order to maximize the life and/or length of the jaw insert.

A still further object of the present invention is to provide adjustment means for precise adjustment of a jaw insert with respect to the pocket member.

A further object of the present invention is to provide a method of gripping a work piece in a chuck system.

Generally, the present invention includes a jaw system for use in connection with a chuck for a lathe, milling machine, or the like used to hold stock being worked, and includes a receiver, or pocket, member for attachment to the chuck and an engagement member for engaging the stock. The engagement member is attached to the receiver member, and the receiver member defines a longitudinally-extending recess for receipt of the engagement member. A locking means is provided for selectively locking the engagement member to the receiver member.

More specifically, the receiver member is attached to a master jaw of the chuck and, in one preferred embodiment, includes an elongated slot which allows some flexibility in the positioning of the receiver member with respect to the master jaw. The engagement member, or jaw insert, is received within the recess, or pocket, of the pocket member. The jaw insert member is preferably constructed of mild steel and is bar stock of the dimensions of conventional, readily available raw bar stock. The jaw insert member is designed to be sacrificial and expendable. However, because of its relative simplicity and low cost, the benefits are of more expensive, soft jaws are obtained, without the additional cost.

The pocket member is preferably constructed of durable material, such as tool steel, and, since the pocket member does not actually grip the work piece during machining, allows for continued reuse. As compared to the jaw insert, the pocket member is of more complex manufacture and cost, but may only require a single purchase, with the expendable portion of the jaw system, namely, the jaw insert, being replaceable at low cost and of relatively simple manufacture.

The jaw system of the present invention also allows for precise adjustment, or extension, of the jaw insert from the pocket member through use of unique adjustment screws. An adjustment screw can be provided in the pocket member for adjusting the position of the jaw insert with respect to the pocket member, or, alternately, the adjustment screw could be provided in the insert itself for achieving such adjustment. Additionally, a spacer member is disclosed which can be used in conjunction with an adjustment screw to gain further extension of a jaw insert from a pocket member, for perhaps reaching parts of small diameters, and for prolonging the usable life of the jaw insert.

The present invention also discloses a method of holding stock or a work piece during machining using an expendable jaw system as set forth herein.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIGS. 3A through 3E illustrate various embodiments of a jaw insert, or engagement, member constructed in accordance with the present invention;

DESCRIPTION OF THE PREFERRED EMBODIMENT

Figure 1:
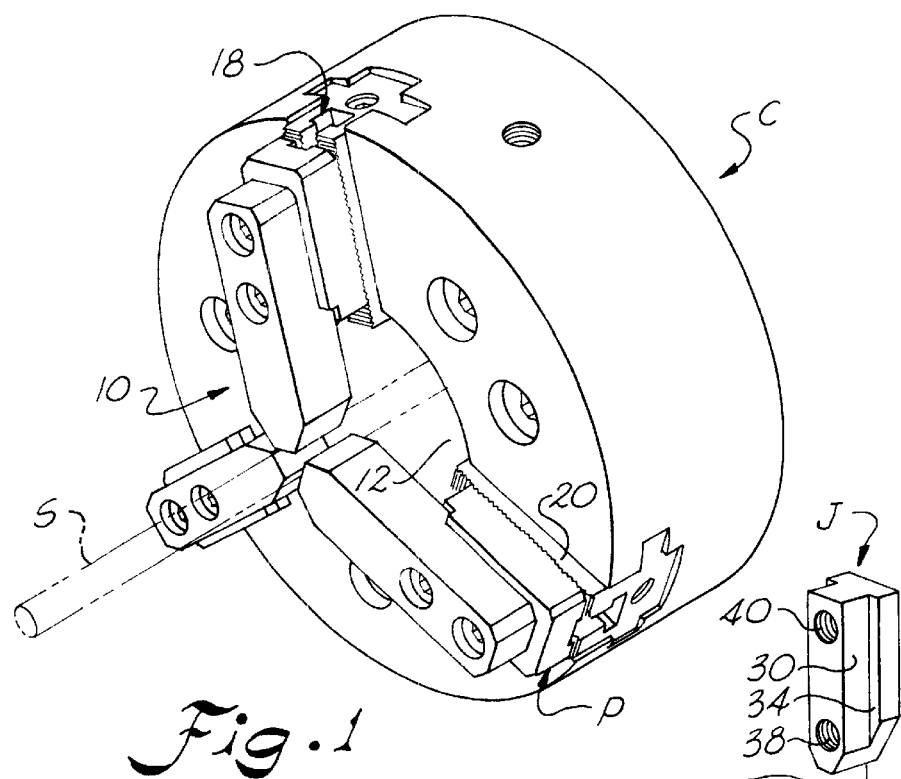
FIG. 1 is a perspective view of a chuck such as used in a lathe having the expendable jaw system of the present invention installed thereon.

The accompanying drawings and the description which follows set forth this invention in its preferred embodiment. However, it is contemplated that persons generally familiar with machinery will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the expendable jaw system of the present invention is indicated generally in the figures by reference character 10.

Turning to FIG. 1, the expendable jaw system 10 of the present invention is illustrated as installed on a conventional chuck, generally C. Chuck C includes an axial passage 12 for receipt of work piece or stock, generally S. Chuck C includes master jaws, generally 18, which are moved radially inwardly or outwardly with respect to passage 12, hydraulically, pneumatically, manually or through some other means, in conventional manner. Three master jaws 18 are shown on chuck C and are equi-distantly and radially spaced from one other at approximately 120 degree separations. Master jaws 18 also include conventional serrated tracks 20 to which conventional top jaws are attached.

Figure 2:
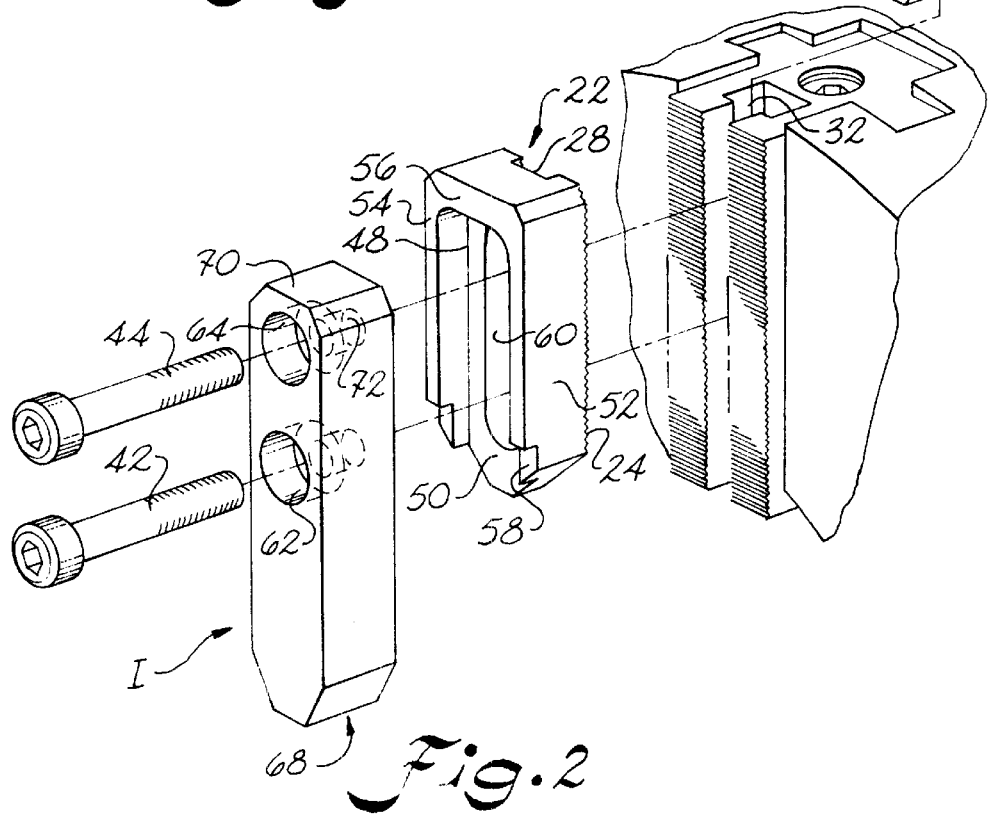
FIG. 2 is an exploded view of an expendable jaw system constructed in accordance with the present invention.

In one preferred embodiment, jaw system 10 includes a receiver, or pocket, member, generally P which is positioned on serrated tracks 20 of master jaws 18. Pocket members P include base portions, generally 22, having serrations 24 defined thereon. Also defined in base portion 22 is a longitudinally extending channel 28, which, as shown in FIG. 2, receives the ridge 30 of a jaw nut, generally J carried within a channel 32 provided in master jaw 18. Jaw nut J is of a generally inverted T-shaped cross section, having flange portions 34 for receipt in channel 32.

Jaw nut J also includes two threaded bores 38, 40 for receipt of bolts 42, 44 which are used to lock jaw system 10 in place on a master jaw 18.

Pocket member P includes a recess, or pocket, 48 for receipt of an engagement, or jaw insert, member, generally I. Pocket 48 includes a floor 50 on which insert I rests during use, insert I being fixed within pocket 48 by bolts 42, 44 engaging jaw nut J. Side walls 52, 54 and end wall 56 of pocket member P form the boundaries of pocket 48, and floor 50 of pocket 48 generally extends outwardly beyond side walls 52, 54. Note, as shown in FIG. 2, side walls 52, 54 include notches 58, which provide clearance for continued gripping stock S, and in particular small diameter stock S, or stock S having multiple, different diameters or peripheral profiles without such stock contacting pocket member P during use, but instead is gripped by insert I.

It should be noted that although only one pocket member P, insert I, and jaw nut combination are being discussed for simplicity purposes, two other such combinations are also provided on the chuck as shown in FIG. 1, one for each master jaw of the chuck. Should a chuck have additional master jaws, then an additional combination would be provided for each master jaw of the chuck.

Pocket member P includes an elongated slot 60 defined within recess floor 50 for receipt of bolts 42, 44. The slot 60 allows for jaw insert I to be moved longitudinally within pocket 48 without requiring pocket member P to be moved with respect to a master jaw 18. Thus, as jaw insert I is used, and becomes shortened during such use, insert I can be moved forward with respect to pocket member P, once pocket member P has been advanced as close to central passage 12 as is allowable, to therefore gain the most use of insert I as practical.

Insert I includes countersunk bores, 62, 64 for receipt of bolts 42, 44, respectively, and also includes an engagement end, generally 68, for actually engaging stock S, and a rearward end 70. It is noted that rearward end 70 includes chamfered portions 72 and that engagement end is "pointed," or tapered-in, in the embodiments of jaw insert I shown in FIGS. 1, 2, 3C 5, 6, and 8–10. It is to be understood, however, that the engagement end of an insert I can take on a variety of different sizes, shapes, and configurations. FIG. 3A illustrates an insert I having a squared off engagement end 74. Also in FIG. 3A, the reduction in length of insert I during use is illustrated in phantom lines, with the initial end of insert I being represented by reference number 74, and the squared off end by reference numeral 76, which results after use or cutting of insert I to length.

Paragraph 3B illustrates an insert I having a concave engagement end 78, such concave end having been formed in order to accommodate stock of a certain diameter.

FIG. 3C illustrates the pointed, or tapered-in end 79, and FIG. 3D illustrates an engagement end 68, which is wider than pocket 48 and has a pointed end 80 to accommodate certain work stock peripheries. FIG. 3E illustrates an insert having an enlarged, outwardly flared engagement end 82.

Figure 4:
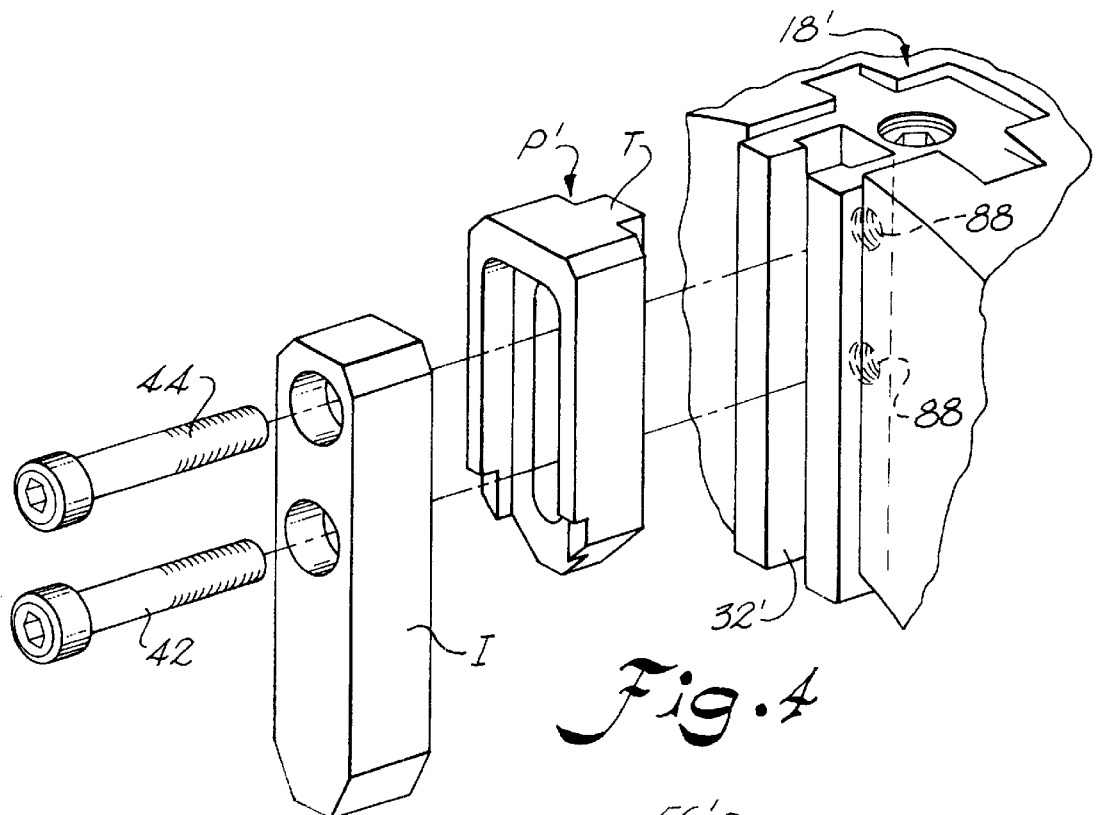
FIG. 4 illustrates an exploded view of an alternate embodiment of an expendable jaw system constructed in accordance with the present invention.

FIG. 4 illustrates a pocket member P' having a tongue T for engagement within a different style of master jaw, wherein serrations are not used at the interface between master jaw 18' and pocket member P'. Instead, tongue T extends downwardly through a channel 32' within master jaw 18'. Note bores 88 provided in jaws 18' for receipt of bolts 42, 44.

Figure 5:
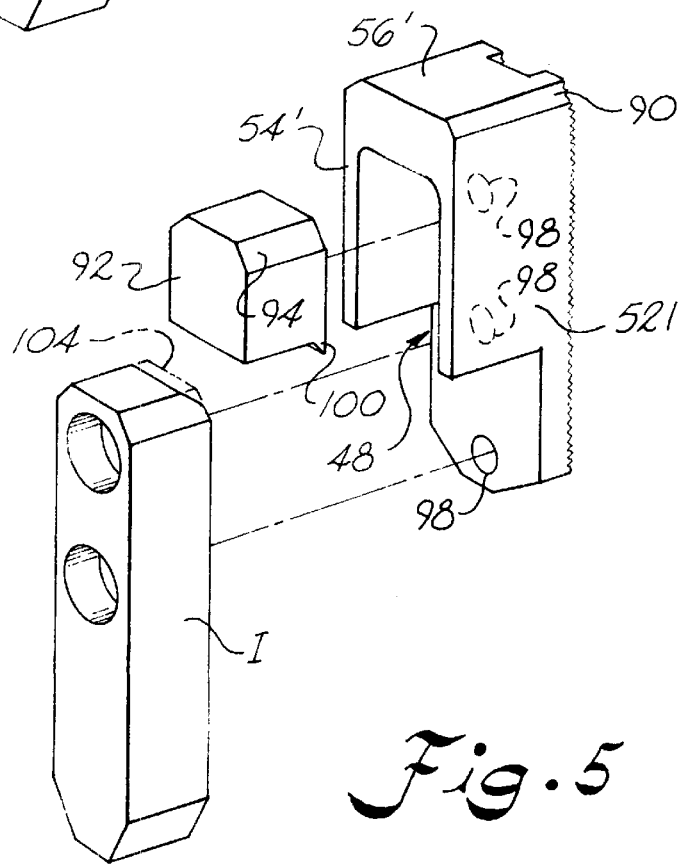
FIG. 5 is and exploded view of another alternate embodiment of an expendable jaw system constructed in accordance with the present invention having a spacer member.

FIG. 5 includes an alternate embodiment pocket member 90 having taller side walls 52', 54' and end wall 56' as compared to pocket member P discussed above. Also provided is a spacer member 92 for receipt in pocket 48 of pocket member 90. Note spacer 92 includes chamfers 94 for receipt within the radiused corners of recess 48 at the juncture of side walls 52', 54' and end wall 56'. Instead of a slot 60, pocket member 90 includes three holes 98 for receipt of bolts 42, 44. Spacer member 92 is held in place by virtue of a flange 100 provided on a base portion 102 thereof which is received by a corresponding notch 104 in insert I. Thus, once spacer member 92 is installed, and insert I bolted into place, spacer 92 is securely retained within pocket member 90. Although the spacer member 92 could be a variety of different lengths, in one preferred embodiment, the length of spacer member 92 is approximately the length between the center lines of holes 98, therefore allowing a step increase in the effective length of insert I in a manner to allow bolts 42, 48 and corresponding bores 62, 64 of insert I to properly align.

Figure 6:
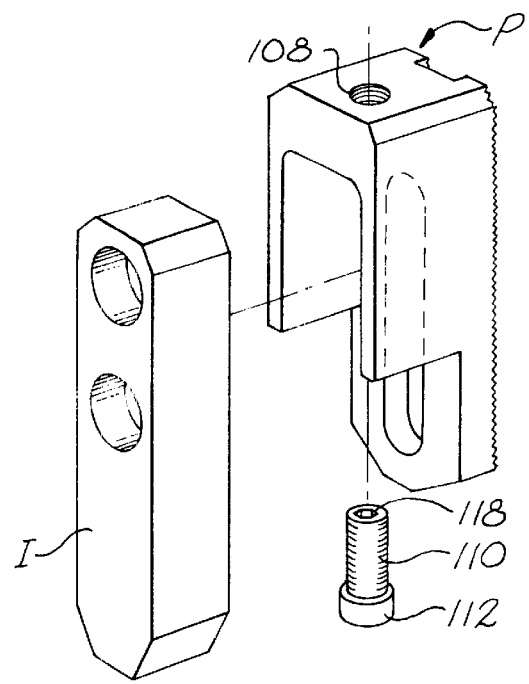
FIG. 6 is an exploded view of an expendable jaw system constructed in accordance with the present invention having means for adjusting movement a jaw insert member.

FIG. 6 illustrates pocket member P having a threaded bore 108 for receipt of an adjustment screw on 10. Note adjustment screw 110 includes an enlarged portion 112 having an internal drive profile 114 which may be hexagonal in shape for receipt of Allen wrench, or it could be variety of other drive profiles, such as a slot, Phillips head, Torx profile, or the like. At the other end of adjustment screw 110, such end 116 being threaded, another internal drive profile 118 is provided which, as with drive profile 114, is shown as being a hexagonal shape, but could be a variety of other drive profiles.

Figure 8:
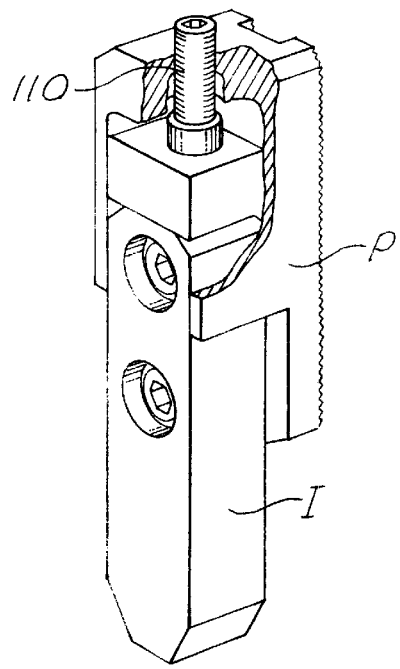
FIG. 8 is perspective view, with parts cut away, of a further variation of adjustment means for moving the jaw insert member with respect to the pocket member.
Figure 7:
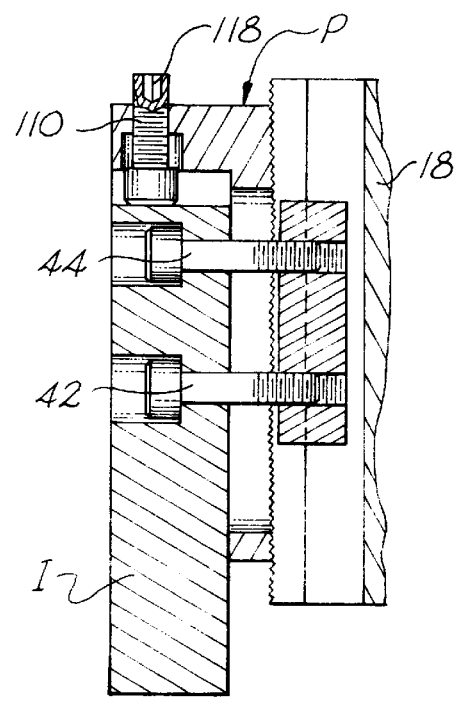
FIG. 7 is a sectional view of use of the adjustment means shown in FIG. 6.

FIGS. 7 and 8 show uses of adjustment screw 110. As shown in FIG. 7, adjustment screw is threadingly engaged with bore 108 of pocket member P such that the enlarged head, 112 bears against the rearward end 70 of insert I. By using a tool to engage a profile 118 of adjustment screw 110, insert I can be advanced outwardly through turning of adjustment screw 110. This, of course, assumes that bolts 42, 44 have not yet been tightened down. Once insert I has been properly positioned, using adjustment screw 110, bolts 42, 44 can then be tightened to lock insert I into place. Accordingly, use of adjustment screw 110 allows for fine adjustment of insert I.

In FIG. 8, adjustment screw 110 is illustrated as bearing upon spacer member 92, instead of directly upon insert I. As discussed above, through use of spacer member 92, the effective length of insert I can be increased, and use of adjustment screw 110 allows for fine adjustment of insert I.

Figure 9:
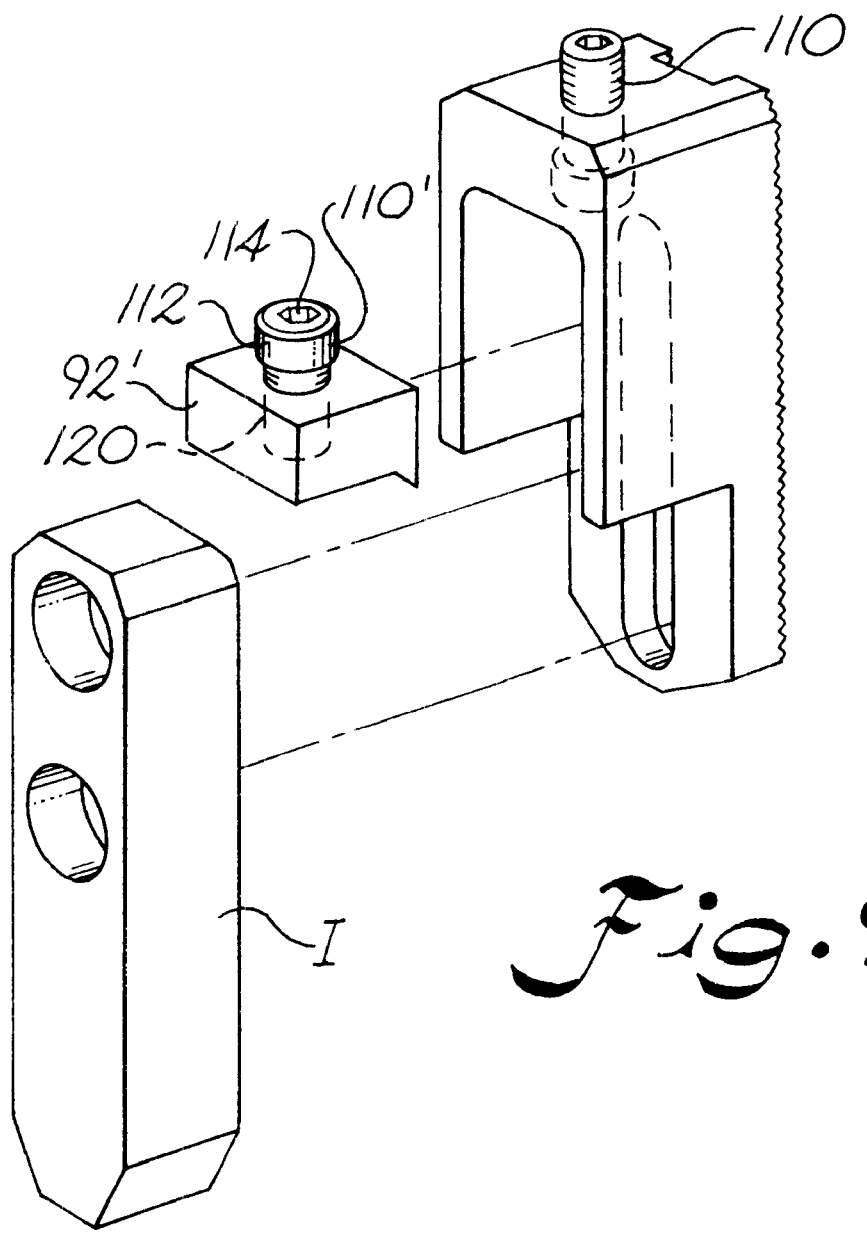
FIG. 9 is and exploded view of another alternate embodiment of an expendable jaw system constructed in accordance with the present invention having further adjustment means for moving the jaw insert member with respect to the pocket member.

FIG. 9 illustrates use of a spacer, or adjustment, block 92' having a threaded bore 120 for receipt of an adjustment screw 110'. FIG. 9 also illustrates an adjustment screw 110, either of which could be used to urge spacer block 92 and, in turn, insert I outwardly. However, ordinarily, only adjustment screw 110' would be used at a given time. Assuming adjustment screw 110' is being used, a tool such as an Allen wrench, would be inserted in bore 108 of pocket member P in order to engage with drive profile 114 of the head portion 112 of adjustment screw 110'. Note adjustment block 92' is shorter in length than spacer member 92, thereby allowing for adjustment of insert I by an increment smaller than the length of spacer 92 and, accordingly, an increased range of adjustment of insert I through use of adjustment screws 110 or 110'. Use of adjustment member 92' and adjustment screw 110' allows for the length of adjustment screw 110' to be minimized while allowing maximum use of length of screw 110' in moving insert I outwardly.

Figure 10:
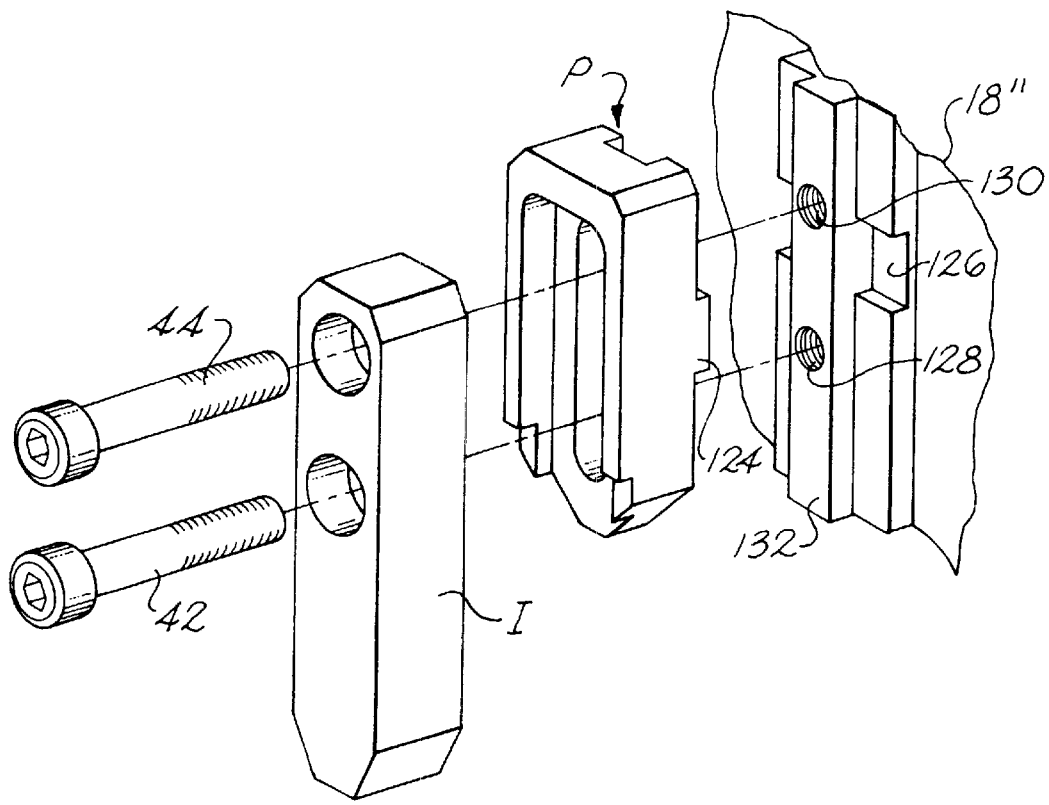
FIG. 10 is an exploded view of a further alternate embodiment of an expendable jaw system constructed in accordance with the present invention showing a pocket member-chuck interface of a differing type.

FIG. 10 illustrates pocket member P having on its base portion transversely-extending lips 124 for receipt in transverse slots 126 of master jaw 18". Bores 128, 130 are threaded for receipt of bolts 42, 44, respectively. Master jaw 18" also includes a tongue 132 for receipt within channel 28 of pocket member P, with bolts 42, 48 being used to lock insert I and pocket member P to master jaw 18".

In use of jaw system 10 for a typical situation of machining stock or a work piece, pocket members P are placed on master jaws 18 of a chuck C, with inserts being carried within the pocket 48 of each pocket member P. Inserts I are moved towards one another to engage the work piece or for being bored or otherwise shaped themselves for engaging a work piece of a particular diameter or profile. Once the inserts I are properly positioned for engaging the work piece, either manually or through use of spacer members 92 and adjustment screw 110, the inserts I and pocket members P are locked into position with bolts 42, 44 onto jaws 18. Inserts I are then used to grip the work piece as the work piece is machined. After such machining, the inserts I can potentially be re-used, with any necessary reshaping of the inserts I being made, or simply discarded if no longer practical to reuse.

Although chuck C has been shown in use with stock S carried within its central passage 12, there are occasions where a work piece would be gripped from the inside of the work piece, such as would be the case for gears having flanges. During machining of such parts, it may be necessary to grip the inside portions of the flanges such that the part can be rotated in a lathe for truing the outside of the flanges. The jaw system 10 of the present invention can also be used in those situations, with the pocket members simply being rotating 180° from what is shown in the drawings and reattached to the jaws of the chuck. In this manner, the inserts I would be adjusted to extend radially outwardly as necessary for gripping the work piece.

Spacer members 92, 92' allow for increased versatility of gripping a work piece with a chuck. For example, in machining a cam, which has eccentric, i.e., spaced apart centers of revolution, the jaw system 10 could be used to bore an insert I on a first center, and then a spacer member 92 or 92' could be used as necessary to reach the eccentric position in order to bore the insert I of the jaw system 10 on the second center.

Another advantage of the jaw system 10 of the present invention is that it allows for independent boring of jaw inserts on one machine for use on another machine or another portion of the same machine. For example, system 10 allows for boring or sizing of jaws on one machine, such as on a lathe, and then allows for subsequent removal of the jaws and moving of the jaws to another machine, or another portion of the same lathe machine with any needed adjustment being made using adjustment screws 110 or 110' and/or spacer blocks 92 or 92', as necessary.

Further, jaw system 10 should allow for a reduction in machining costs. Because inserts 10 are less expensive than conventional jaws, they can be more realistically sacrificed for use on smaller diameter stock or stock having unique peripheral profiles.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A jaw system for use in connection with a chuck for receiving stock to be worked, the jaw system comprising:
   a receiver member for attachment to the chuck, said receiver member defining a longitudinally extending recess and a longitudinally extending slot within said recess;
   an engagement member for engaging the stock, said engagement member being adjacent to said receiver member and carried in said recess of said receiver member; and
   at least one locking member for selectively fixing said engagement member to said receiver member.

2. The jaw system as defined in claim 1, further comprising said receiver member including a serrated base portion for engaging with the chuck.

3. The jaw system as defined in claim 1, further comprising said receiver member including a longitudinally extending tongue for engaging with the chuck.

4. The jaw system as defined in claim 1, further comprising:
   a jaw nut for connection to the chuck, said jaw nut having a ridge; and
   said receiver member including a longitudinally extending channel for receiving said ridge.

5. The jaw system as defined in claim 1, further comprising said receiver member including at least one transversely extending lip for engaging with the chuck.

6. The jaw system as defined in claim 1, further comprising said receiver member including at least one adjustment screw for selectively moving said engagement member longitudinally within said recess of said receiver member.

7. The jaw system as defined in claim 1, further comprising said receiver member defining side walls adjacent said recess and said recess defining a floor portion, and wherein said floor portion extends outwardly beyond said side walls.

8. The jaw system as defined in claim 1, wherein said engagement member defines an end having a tapered-in profile.

9. The jaw system as defined in claim 1, wherein said engagement member defines an end which is wider than said recess of said receiver member.

10. The jaw system as defined in claim 1, wherein said receiver member includes side walls adjacent said recess and wherein said engagement member extends above said side walls of said receiver member.

11. The jaw system as defined in claim 1, further comprising a spacer member carried in said recess of said receiver member adjacent to said engagement member.

12. The jaw system as defined in claim 1, further comprising:
   a spacer member carried in said recess of said receiver member adjacent to said engagement member; and
   at least one adjustment screw in said spacer member for selectively moving said spacer member longitudinally within said recess of said receiver member.

13. The jaw system as defined in claim 1, wherein said engagement member defines a notch, and further comprising a spacer member carried in said recess of said receiver member adjacent to said engagement member, said spacer member having a flange for receipt by said notch of said engagement member.

14. The jaw system as defined in claim 1, further comprising:
   a spacer member carried in said recess of said receiver member adjacent to said engagement member; and
   at least one adjustment screw in said receiver member for selectively moving said spacer member longitudinally within said recess of said receiver member.

15. The jaw system as defined in claim 1, wherein said locking member is received in said longitudinally extending slot for allowing selective longitudinal movement of said engagement member with respect to said locking member.

16. The jaw system as defined in claim 1, wherein said engagement member defines an engagement end for engaging the stock, and wherein said engagement end is tapered-in.

17. The jaw system as defined in claim 1, wherein said engagement member defines an engagement end for engaging the stock, and wherein said engagement end is generally concave.

18. The jaw system as defined in claim 1, wherein said engagement member defines an engagement end for engaging the stock, and wherein said engagement end is generally convex.

19. The jaw system as defined in claim 1, wherein said engagement member defines an engagement end for engaging the stock and a rearward end opposite said engagement end, and wherein said rearward end is generally pointed.

20. A jaw system for use in connection with a chuck for receiving stock to be worked, the jaw system comprising:
   a receiver member for attachment to the chuck, said receiver member defining a longitudinally extending recess;
   an engagement member for engaging the stock, said engagement member being carried in said recess of said receiver member;
   at least one locking member for selectively fixing said engagement member to said receiver member; and
   said receiver member including at least one adjustment screw for selectively moving said engagement member longitudinally within said recess of said receiver member, and wherein said adjustment screw includes an enlarged head portion having a drive profile at one end thereof and a drive profile at the other end thereof.

21. A jaw system for use in connection with a chuck for receiving stock to be worked, the jaw system comprising:
   a receiver member for attachment to the chuck, said receiver member defining a longitudinally extending recess;

an engagement member for engaging the stock, said engagement member being carried in said recess of said receiver member;

at least one locking member for selectively fixing said engagement member to said receiver member; and said receiver member including at least one adjustment screw for selectively moving said engagement member longitudinally within said recess of said receiver member, and wherein said adjustment screw includes at one end thereof an enlarged head portion having an internal hexagonal drive profile and an internal hexagonal drive profile at the other end thereof.

22. A jaw system for use in connection with a chuck for receiving stock to be worked, the jaw system comprising:

a receiver member for attachment to the chuck, said receiver member defining a longitudinally extending recess, said receiver member defining side walls adjacent said recess and said recess defining a floor portion, and wherein said floor portion extends outwardly beyond said side walls;

an engagement member for engaging the stock, said engagement member being adjacent to said receiver member and carried in said recess of said receiver member;

at least one locking member for selectively fixing said engagement member to said receiver member; and said recess of said receiving member defining an elongated slot for receipt of said locking member and for allowing selective longitudinal movement of said engagement member with respect to said locking member.

23. A clamping system for use in connection with a device for machining stock, the clamping system comprising:

a chuck defining a stock passage for receiving stock to be machined, said chuck having at least one jaw movable towards and away from said stock passage;

a receiver member for attachment to at least one of said jaws of said chuck, said receiver member defining a longitudinally extending recess and a longitudinally extending slot within said recess;

an engagement member for engaging the stock, said engagement member being adjacent to said receiver member and carried in said recess of said receiver member; and at least one locking member for selectively fixing said engagement member to said receiver member.

24. The clamping system as defined in claim 23, further comprising said receiver member defining side walls adjacent said recess and said recess defining a floor portion, and wherein said floor portion extends outwardly beyond said side walls.

25. The clamping system as defined in claim 23, further comprising said locking member being received in said longitudinally extending slot for allowing selective longitudinal movement of said engagement member with respect to said locking member.

26. A method of holding stock on a device during machining of the stock, the method comprising:

providing a chuck defining a stock passage for receiving stock to be machined, said chuck having at least one jaw movable towards and away from said stock passage;

inserting the stock in said passage;

providing a receiver member, said receiver member defining a longitudinally extending recess and a longitudinally extending slot;

attaching said receiver member to said at least one jaw of said chuck;

providing an engagement member for engaging the stock;

inserting said engagement member in said recess of said receiver member such that said engagement member is adjacent to said receiver member;

providing at least one locking member; and selectively fixing said engagement member to said receiver member with said locking member.

27. The method as defined in claim 26, further comprising:

providing an adjustment screw for contacting said engagement member; and turning said adjustment screw to move said engagement member to a predetermined position with respect to said receiver member.

* * * * *

UNITED STATES PATENT AND TRADEMARK OFFICE
CERTIFICATE OF CORRECTION

PATENT NO.    : 6,478,311 B1                                        Page 1 of 1
DATED         : November 12, 2002
INVENTOR(S)   : Hinson It is certified that error appears in the above-identified patent and that said Letters Patent is hereby corrected as shown below:

Column 10,
Line 23, after the word "slot" and before the semicolon, add -- within said recess --

Signed and Sealed this

Tenth Day of June, 2003

JAMES E. ROGAN
*Director of the United States Patent and Trademark Office*